United States Patent [19]
Leaders

[11] Patent Number: 6,003,164
[45] Date of Patent: Dec. 21, 1999

[54] POOL MONITOR AND CONTROLLER

[76] Inventor: Homer G. Leaders, 8165 Lakes San Carlos Cir., Fort Myers, Fla. 33912

[21] Appl. No.: 09/127,878

[22] Filed: Jul. 31, 1998

[51] Int. Cl.$^6$ ..................................................... E04H 4/00
[52] U.S. Cl. ........................ 4/507; 4/508; 4/509; 4/493; 4/496
[58] Field of Search ................................ 4/507, 508, 509, 4/488, 493, 496; 210/169, 85, 142, 139

[56] References Cited

U.S. PATENT DOCUMENTS

| | | | |
|---|---|---|---|
| 3,804,253 | 4/1974 | Wellman et al. | 210/169 |
| 4,016,079 | 4/1977 | Severin | 210/139 |
| 4,381,240 | 4/1983 | Russell | 210/169 |
| 4,612,949 | 9/1986 | Henson | 4/507 |
| 5,422,014 | 6/1995 | Allen et al. | 210/139 |

*Primary Examiner*—David J. Walczak

[57] ABSTRACT

A pool monitoring and control system is provided including a pool having a plurality of inputs and a plurality outputs. Also included is a pump for suctioning fluid from the outputs of the pool only during the activation thereof. A control assembly is connected between the pump and the pool. The control assembly includes at least one sensor adapted to generate an activation signal upon a parameter of the pool falling out of a predetermined range. Further, at least one dispenser is included for dispensing a parameter correction fluid upon the actuation thereof. In use, the control assembly, when the pump is activated, is adapted to actuate the dispenser if the activation signal is received.

19 Claims, 3 Drawing Sheets

POOL MONITOR AND CONTROLLER

BACKGROUND OF THE INVENTION

1. Field of the Invention

The present invention relates to pool water treatment systems and more particularly pertains to a new pool monitor and controller for monitoring and automatically servicing a pool.

2. Description of the Prior Art

The use of pool water treatment systems is known in the prior and more specifically, pool water treatment systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art pool water treatment systems include U.S. Pat. Nos. 5,422,014; 3,292,650; 4,648,043; 2,054,881; 5,019,250; and Foreign Patent Nos. WO 91/08530 A1 & EP 0 382 860 A1.

In these respects, the pool monitor and controller according to the present invention substantially departs from the conventional concepts and designs of the prior art, and in so doing provides an apparatus primarily developed for tile purpose of monitoring and automatically servicing a pool.

SUMMARY OF THE INVENTION

In view of the foregoing disadvantages inherent in the known types of pool water treatment systems now present in the prior art, the present invention provides a new pool monitor and controller construction wherein the same can be utilized for monitoring and automatically servicing a pool.

The general purpose of the present invention, which will be described subsequently in greater detail, is to provide a new pool monitor and controller apparatus and method which has many of the advantages of the pool water treatment systems mentioned heretofore and many novel features that result in a new pool monitor and controller which is not anticipated, rendered obvious, suggested, or even implied by any of the prior art pool water treatment systems, either alone or in any combination thereof.

To attain this, the present invention generally comprises a pool having a plurality of peripheral inputs for receiving fluid to be dispensed within the pool. Further, as shown in FIG. 2, the pool includes a plurality outputs including a peripheral output and a lower output for extracting fluid from the pool. Connected to the outputs of the pool is a strainer for straining large debris from the fluid being extracted from the pool. Connected between the outputs of the pool and the strainer is a first three-way valve. The first three-way valve is adapted for selectively allowing the flow of fluid to the strainer. To accomplish this, the first three-way valve has a first orientation for allowing the flow of fluid to the strainer only from the peripheral output and a second orientation for allowing the flow of fluid to the strainer only from the lower output. Next provided is a pump connected to the strainer for suctioning fluid from the outputs of the pool only during the activation thereof. For filtering small debris from the fluid being extracted from the pool, a filter is connected to the pump. A heater is connected to an output of the filter for heating the fluid received therefrom only during the actuation thereof. As shown in FIG. 2, the heater further has an output with a one-way check valve for only allowing the flow of fluid out of the heater. Also included is a second three-way valve connected between the output of the filter and the one-way check valve. In operation, the second three-way valve has a first orientation for directing fluid from the filter only into the heater and a second orientation for bypassing the fluid from the filter around the heater. While not specifically shown, a water level sensor is mounted on the pool for generating a level activation signal upon a level of fluid within the pool dropping below a predetermined amount. With reference now to FIG. 3, a control assembly is provided including a tube with a U-shaped configuration having a first end connected between the second three-way valve and the one-way check valve of the heater. A second end of the tube is connected to the inputs of the pool. Mounted at the first end of the tube is a bypass valve which is further connected between the first end and second end. In a first orientation, the bypass valve is adapted for allowing the flow fluid between the first end and second end only through the tube. Further, in a second orientation, the bypass valve functions for allowing the flow of fluid between the first end and second end only through a bypass conduit which is connected therebetween. For ensuring that fluid only flows out of the second end of the tube, a check valve is situated at the second end of the tube. For selectively draining the tube, a drain valve is mounted on each end of the tube. The tube further includes a linear input extent and a linear output extent. The control assembly further includes a chlorine, pH and alkalinity assembly each having a chlorine, pH and alkalinity sensor, respectively, mounted on the input extent of the tube for generating an associated activation signal upon the chlorine, pH and alkalinity dropping below a predetermined amount, respectively. Associated therewith is a chlorine, pH and alkalinity dispenser mounted on the output extent of the tube for dispensing chlorine, pH and alkalinity, respectively, within the output extent of the tube during the actuation thereof. Also mounted on the input extent of the tube is a temperature sensor for generating a temperature activation signal upon the temperature dropping below a predetermined amount. A water dispenser is mounted on the bypass conduit of the tube for dispensing water within the inputs of the pool upon the actuation thereof. Finally, a control box is provided which is constructed from a plastic material and mounted between the input extent and output extent of the tube. The control box includes a controller which niay take the form of hardware, a computer with appropriate software or a combination thereof. The controller is connected to the pump, water lever sensor, temperature sensor, and the sensors of each of the chlorine, alkalinity and pH assemblies. The controller is further connected to the water dispenser, heater and the dispensers of each of the chlorine, alkalinity and pH assemblies. In use, the controller serves to activate the pump for a predetermined amount of time each hour. During activation of the pump, tile controller is adapted actuate the water dispenser for the predetermined amount of time upon the receipt of the activation signal from the water level sensor. Further, the controller actuates the heater for the predetermined amount of time upon the receipt of the activation signal from the temperature sensor. Also during the activation of the pump, the controller serves to actuate the dispensers of the chlorine, alkalinity and pH assemblies for tile predetermined amount of time upon the receipt of the activation signals from the sensors of the chlorine, alkalinity and pH assemblies, respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrange ments of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pool monitor and controller apparatus and method which has many of the advantages of the pool water treatment systems mentioned heretofore and many novel features that result in a new pool monitor and controller which is not anticipated, rendered obvious, suggested, or even implied by any of the prior art pool water treatment systems, either alone or in any combination thereof.

It is another object of the present invention to provide a new pool monitor and controller which may be easily and efficiently manufactured and marketed.

It is a further object of the present invention to provide a new pool monitor and controller which is of a durable and reliable construction.

An even further object of the present invention is to provide a new pool monitor and controller which is susceptible of a low cost of manufacture with regard to both materials and labor, and which accordingly is then susceptible of low prices of sale to the consuming public, thereby making such pool monitor and controller economically available to the buying public.

Still yet another object of the present invention is to provide a new pool monitor and controller which provides in the apparatuses and methods of the prior art some of the advantages thereof, while simultaneously overcoming some of the disadvantages normally associated therewith.

Still another object of the present invention is to provide a new pool monitor and controller for monitoring and automatically servicing a pool.

Even still another object of the present invention is to provide a new pool monitor and controller that includes a pool having a plurality of inputs and a plurality outputs. Also included is a pump for suctioning fluid from the outputs of the pool only during the activation thereof. A control assembly is connected between the pump and the pool. The control assembly includes at least one sensor adapted to generate an activation signal upon a parameter of the pool falling out of a predetermined range. Further, at least one dispenser is included for dispensing a parameter correction fluid upon the actuation thereof. In use, the control assembly, when the pump is activated, is adapted to actuate the dispenser if the activation signal is received.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
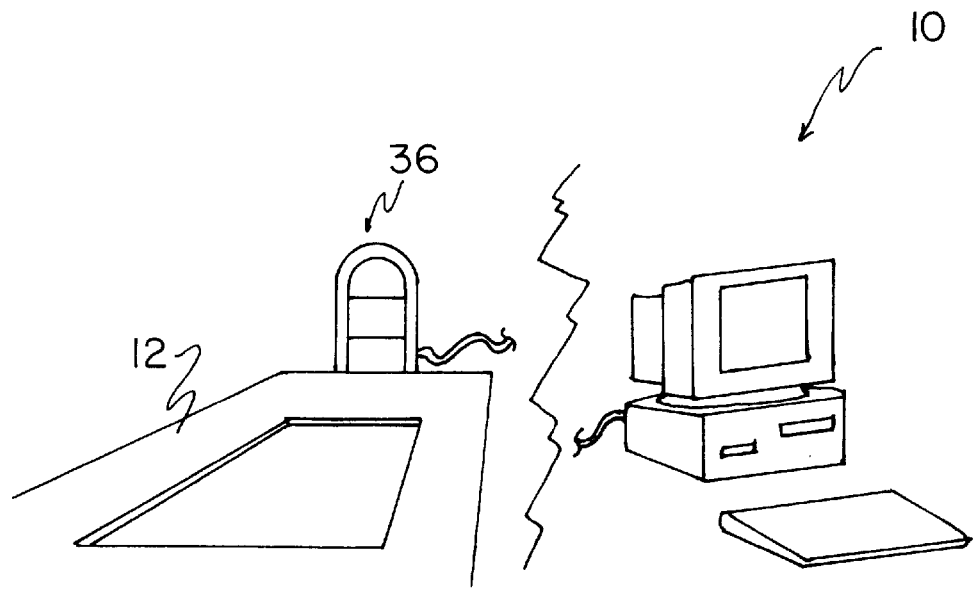
FIG. 1 is a perspective view of a new pool monitor and controller according to the present invention.

With reference now to the drawings, and in particular to FIGS. 1 through 4 thereof, a new pool monitor and controller embodying the principles and concepts of the present invention and generally designated by the reference numeral 10 will be described.

Figure 2:
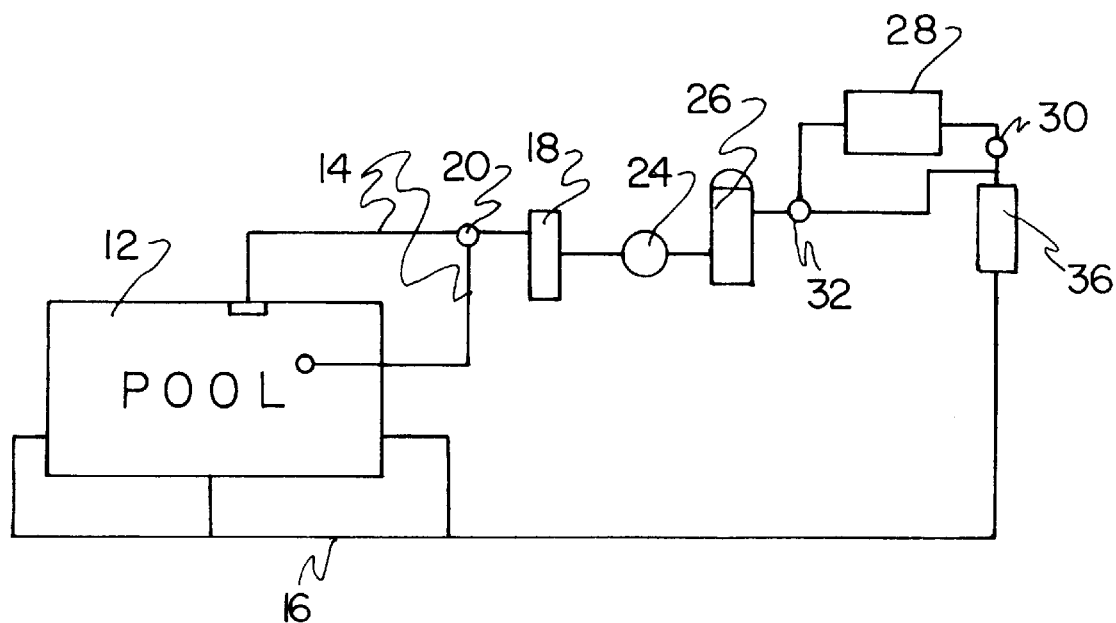
FIG. 2 is a schematic diagram of the present invention.

The present invention, designated as numeral 10, includes a pool 12 having a plurality of peripheral inputs 16 for receiving fluid to be dispensed within the pool. Further, as Shown in FIG. 2, the pool includes a plurality outputs 14 including a peripheral output and a lower output for extracting fluid from the pool.

Connected to the outputs of the pool is a strainer 18 for straining large debris from the fluid being extracted from the pool Connected between the outputs of the pool and the strainer is a first three-way valve 20. The first three-way valve is adapted for selectively allowing the flow of fluid to the strainer. To accomplish this, the first three-way valve has a first orientation for allowing the flow of fluid to the strainer only from the peripheral output and a second orientation for allowing the flow of fluid to the strainer only from the lower output.

Next provided is a pump 24 connected to the strainer for suctioning fluid from the outputs of the pool only during the activation thereof. For filtering small debris from the fluid being extracted from the pool, a filter 26 is connected to the pump.

A heater 28 is connected to an output of the filter for heating the fluid received therefrom only during the actuation thereof. As shown in FIG. 2, the heater further has an output with a one-way check valve 30 for only allowing the flow of fluid out of the heater.

Also included is second three-way valve 32 connected between the output of the filter and the one-way check valve. In operation, the second three-way valve has a first orientation for directing fluid from the filter only into the heater and a second orientation for bypassing the fluid front the filter around the heater. While not specifically shown, an 57 is mounted on the pool for generating a level activation signal upon a level of fluid within the pool dropping below a predetermined amount. In the preferred embodiment, the water level sensor may take the form of a floater switch, low voltage electrode, PETO tube or the like.

Figure 3:
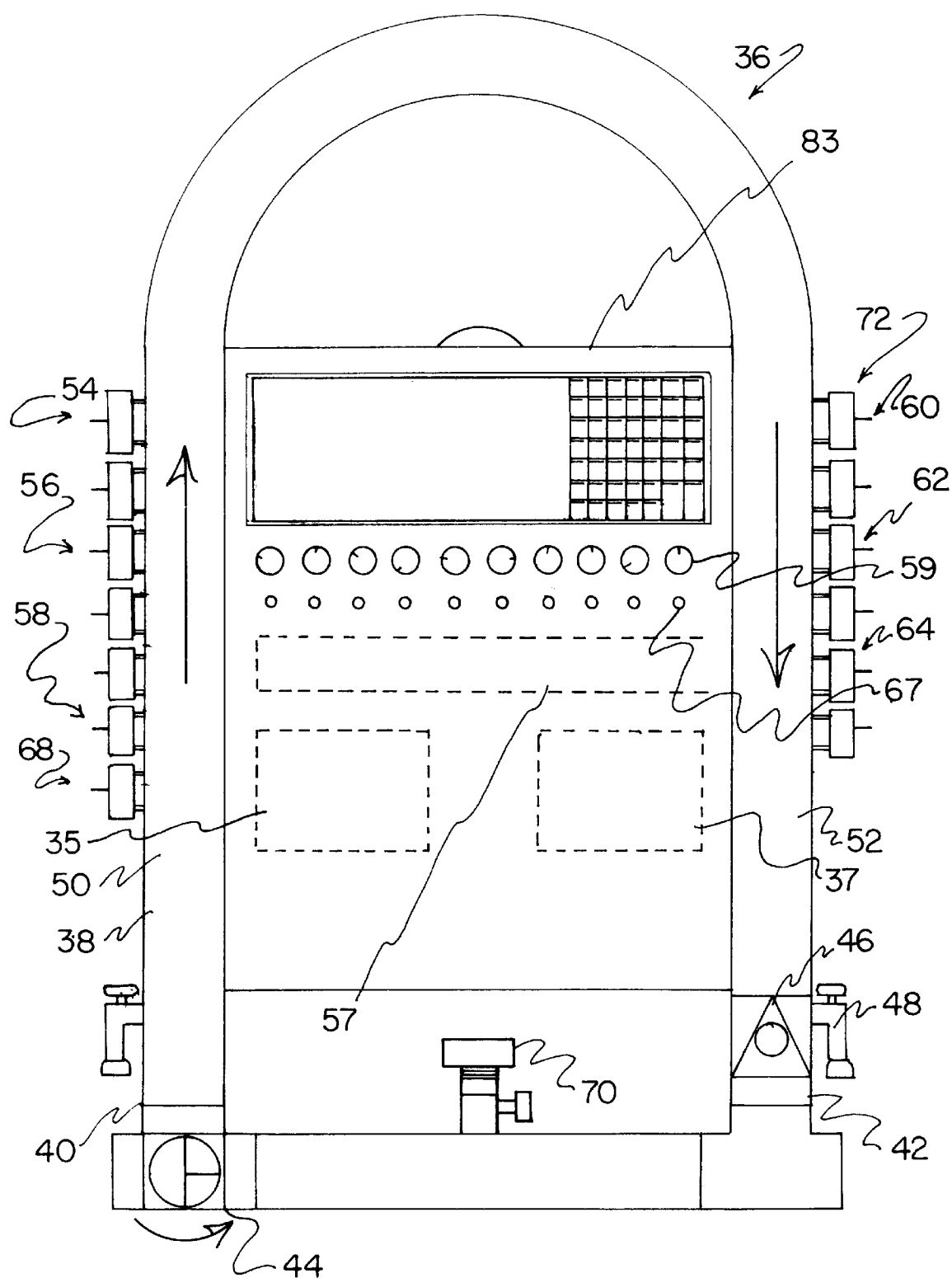
FIG. 3 is a top view of the control assembly of the present invention.

With reference now to FIG. 3, a control assembly 36 is provided including a tube 38 with a U-shaped configuration having a first end 40 connected between the second three-way valve and the one-way check valve of the heater. A second end 42 of the tube is connected to the inputs of the pool.

Mounted at the first end of the tube is a bypass valve 44 which is further connected to the second end via a bypass conduit. In a first orientation, the bypass valve is adapted for allowing the flow fluid between the first end and second end only through the tube. Further, in a second orientation, the bypass valve functions for allowing the flow of fluid between the first end and second end only through the bypass conduit which is connected therebetween.

For ensuring that fluid only flows out of the second end of the tube, a check valve 46 is situated at the second end of the tube. For selectively draining the tube, a drain valve 48 is mounted on each end of the tube. As shown in FIG. 3, the tube is defined by a linear input extent 50 and a linear output extent 52.

The control assembly further includes a chlorine, pH and alkalinity assembly each having a chlorine, pH and alkalinity sensor, 54, 56, & 58, respectively. Each sensor is mounted on the input extent of the tube for generating an associated activation signal upon the chlorine, pH and alkalinity dropping below a predetermined amount, respectively. It should be understood that such activation signal may also be generated simply by the associated parameter falling out of a predetermined range. As an option, each sensor may be equipped with an associated dial 59 to selectively adjust such range.

Associated therewith is a chlorine, pH and alkalinity dispenser 60, 62, & 64 mounted on the output extent of the tube for dispensing a parameter correction fluid such as chlorine, pH correction fluid and alkalinity correction fluid, respectively, within the output extent of the tube during the actuation thereof. Ideally, each dispenser has a corresponding light 67 which illuminates when actuated. The dispensers may take any known form of a gravity, solenoid, or pump driven means for dispensing the associated material.

Also mounted on the input extent of the tube is a temperature sensor 68 for generating a temperature activation signal upon tile temperature of the water passing through the tube dropping below a predetermined amount. A water dispenser 70 is mounted on the bypass conduit of the tube for dispensing water within the inputs of the pool upon the actuation thereof.

Figure 4:
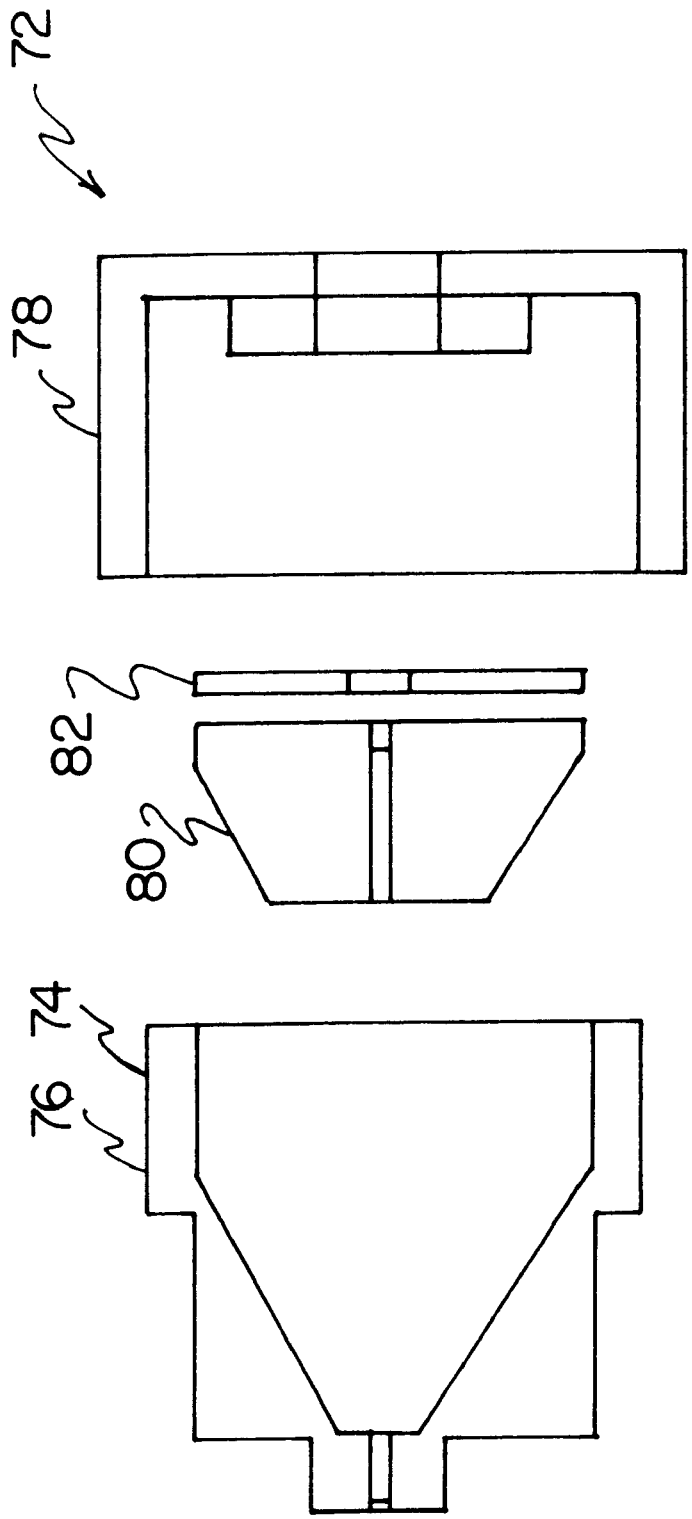
FIG. 4 is an exploded view of one of the brackets of the present invention that hold the sensors and dispensers of the control assembly in place.

As shown in FIG. 4, each of the sensors and the dispensers of the control assembly are attached to the tube with attachment assemblies 72. Each attachment assembly includes a chuck 74 which is attached to the tube and has a threaded exterior 76. Also included is a cap 78 which is screwably fitted on the chuck with a frusto-conical rubber seal 80 situated therebetween. A brass flat washer 82 may also be positioned between the cap and seal. In use, a probe or dispensing tube may be situated within a bore formed in the cap, seal & chuck and secured in placed by simply tightening the cap. By this structure, the sensors and dispensers are easily removed, replaced and serviced.

Finally, a control box 83 is provided which is constructed from a plastic material and mounted between the input extent and output extent of the tube. The control box includes a controller which may take the form of hardware, such as a modem 35 and a playback mechanism 37, a computer with appropriate software or a combination thereof. The controller is connected to the pump, water lever sensor, temperature sensor, and the sensors of each of the chlorine, alkalinity and pH assemblies. The controller is further connected to the water dispenser, heater and the dispensers of the chlorine, alkalinity and pH assemblies.

In use, the controller serves to activate the pump for a userselected predetermined amount of time each hour. During activation of the pump, the controller is adapted actuate the water dispenser for the predetermined amount of time upon the receipt of the activation signal from the water level sensor. Further, the controller actuates the heater for the predetermined amount of time upon the receipt of the activation signal from the temperature sensor. Also during the activation of the pump, the controller serves to actuate the dispensers of the chlorine, alkalinity and pH assemblies for the predetermined amount of time upon the receipt of the activation signals from the sensors of the chlorine, alkalinity and pH assemblies, respectively.

Upon the transmission of at least one of the activation signals from the chlorine, alkalinity and pH assemblies, the pump remains activated for a remainder of the hour or until the lack of receipt of any activation signals. This is to ensure that the dispensed materials are properly circulated within the pool.

It should be noted that the controller is further connected to an modem and playback mechanism. By such interconnection, the controller may dial any number of predetermined phone numbers and play back a warning message. As an option, the phone numbers may be dialed in a predetermined order. Ideally, the modem dials only upon the continued receipt of the same activation signal for an extended period of time such as two subsequent hours. In the alternative, the control may dial the numbers as a function of an extent in which the parameters fall out of a prescribed range.

Further options which may be incorporated with the present invention include a computer interface for allowing a user to monitor the status of the various sensors as a function of time, if desired. The computer interface may also be accessed abroad if necessary. Cameras and audio input devices may also be connected to the computer interface for allowing a user to monitor the pool for security and safety purposes.

As to a further discussion of the manner of usage and operation of the present invention, the same should be apparent from the above description. Accordingly, no further discussion relating to the manner of usage and operation will be provided.

With respect to the above discription then, it is to be realized that the optimum dimensional relationships for the parts of the invention, to include variations in size, materials, shape, form, function and manner of operation assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pool monitoring and control system comprising, in combination:
   a pool having a plurality of peripheral inputs for receiving fluid to be dispensed within the pool and a plurality outputs including a peripheral output and a lower output for extracting fluid from the pool;
   a strainer connected to the outputs of the pool for straining large debris from the fluid being extracted from the pool;
   a first three-way valve connected between the outputs of the pool and the strainer for selectively allowing the flow of fluid to the strainer, the first three-way valve having a first orientation for allowing the flow of fluid to the strainer only from the peripheral output and a second orientation for allowing the flow of fluid to the strainer only from the lower output;
   a pump connected to tile strainer for suctioning fluid from the outputs of the pool only during the activation thereof;
   a filter connected to the pump for filtering small debris from the fluid being extracted from the pool;
   a heater connected to an output of the filter for heating the fluid received therefrom only during the actuation thereof, the heater further having an output with a one-way check valve for only allowing the flow of fluid out of the heater;
   a second three-way valve connected between the output of the filter and the one-way check valve, the second three-way valve having a first orientation for directing fluid from the filter only into the heater and a second orientation for bypassing the fluid from the filter around the heater;
   a water level sensor mounted on the pool for generating a level activation signal upon a level of fluid within the pool dropping below a predetermined amount;
   a control assembly including a tube with a U-shaped configuration having a first end connected between the second three-way valve and the one-way check valve of the heater, a second end connected to the inputs of the pool, a bypass valve mounted at the first end of the tube and further connected between the first end and second end with a first orientation for allowing the flow fluid between the first end and second end only through the tube and a second orientation for allowing the flow of fluid between the first end and second end only through a bypass conduit connected therebetween, a check valve situated at the second end of the tube, and a drain valve mounted on each end of the tube for selectively draining the tube, the tube further including a linear input extent and a linear output extent, wherein the tube further includes:
      a chlorine assembly including a chlorine sensor mounted on the input extent of the tube for generating a chloroine activation signal upon the chlorine dropping below a predetermined amount and an associated chlorine dispenser mounted on the output extent of the tube for dispensing chlorine within the output extent of the tube during the actuation thereof,
      an pH assembly including a pH sensor mounted on the input extent of the tube for generating a pH activation signal upon the pH dropping below a predetermined amount and an associated pH dispenser mounted on the output extent of the tube for dispensing pH correction fluid within tile output extent of the tube during the actuation thereof,
      an alkalinity assembly including an alkalinity sensor mounted on the input extent of the tube for generating a alkalinity activation signal upon the alkalinity dropping below a predetermined amount and an associated alkalinity dispenser mounted on the output extent of the tube for dispensing alkalinity correction Fluid within the output extent of the tube during the actuation thereof,
      a temperature sensor mounted on the input extent of the tube for generating a temperature activation signal upon the temperature dropping below a predetermined amount,
      a water dispenser mounted on the bypass conduit of the tube for dispensing water within the inputs of the pool upon the actuation thereof, and
      a control box constructed from a plastic material and mounted between the input extent and output extent of the tube, the control box including a controller connected to the pump, water lever sensor, temperature sensor, the sensors of each of the chlorine, alkalinity and pH assemblies and further connected to the water dispenser, heater and the dispensers of each of the chlorine, alkalinity and pH assemblies, the controller adapted to activate the pump for a predetermined amount of time each hour and, during activation of the pump, actuate the water dispenser for the predetermined amount of time upon the receipt of the activation signal from the water level sensor, actuate the heater for the predetermined amount of time upon the receipt of the activation signal from the temperature sensor, and actuate the dispensers of the chlorine, alkalinity and pH assemblies for the predetermined amount of time upon the receipt of the activation signals from the sensors of the chlorine, alkalinity and pH assemblies, respectively;
   wherein upon the transmission of at least one of the activation signals from the chlorine, alkalinity and pH assemblies, the pump remains activated for a remainder of the hour;
   wherein the controller is further connected to a modem and playback mechanism for dialing a predetermined number and playing back a message upon the receipt of the same activation signal in two subsequent hours.

2. A pool monitoring and control system comprising, in combination:
   a pool having at least one input and at least one output;
   a pump for suctioning fluid from the output of the pool only during the activation thereof; and
   a control assembly connected between the pump and the pool and including at least one sensor adapted to generate an activation signal upon a parameter of the pool falling out of a predetermined range and at least one dispenser for dispensing a parameter correction fluid upon the actuation thereof, wherein the control assembly, when the pump is activated, actuates the dispenser if the activation signal is received, each sensor and dispenser is mounted on a U-shaped tube with the control assembly mounted therebetween.

3. The pool monitoring and control system as set forth in claim 2 wherein the parameter is chlorine.

4. The pool monitoring and control system as set forth in claim 2 wherein the parameter is alkalinity.

5. The pool monitoring and control system as set forth in claim 2 wherein the parameter is pH.

6. The pool monitoring and control system as set forth in claim 2 wherein the pump is activated for an extended duration if the activation signal is received.

7. The pool monitoring and control system as set forth in claim 2 wherein each sensor and dispenser is mounted on a U-shaped tube which has a bypass conduit with a valve for selectively bypassing the fluid from the pump directly to the pool.

8. The pool monitoring and control system as set forth in claim 2 wherein the control assembly is further connected to a modem and playback mechanism for dialing a predetermined number and playing back a message upon the detection of a deviance in the parameter.

9. The pool monitoring and control system as set forth in claim 2 wherein the control assembly further controls a temperature of water in the pool.

10. The pool monitoring and control system as set forth in claim 2 wherein the control assembly further controls a water level of the pool.

11. A pool monitoring and control system comprising, in combination:

a pool having at least one input and at least one output;

a pump for suctioning fluid from the output of the pool only during the activation thereof; and a control assembly connected between the pump and the pool and including at least one sensor adapted to generate an activation signal upon a parameter of the pool falling out of a predetermined range and at least one dispenser for dispensing a parameter correction fluid upon the actuation thereof, wherein the control assembly, when the pump is activated, actuates the dispenser if the activation signal is received, wherein the control assembly is further connected to a modem and playback mechanism for dialing a predetermined number and playing back a message upon the detection of a deviance in the parameter.

12. The pool monitoring and control system as set forth in claim 11 wherein the parameter is chlorine.

13. The pool monitoring and control system as set forth in claim 11 wherein the parameter is alkalinity.

14. The pool monitoring and control system as set forth in claim 11 wherein the parameter is pH.

15. The pool monitoring and control system as set forth in claim 11 wherein the pump is activated for an extended duration if the activation signal is received.

16. The pool monitoring and control system as set forth in claim 11 wherein each sensor and dispenser is mounted on a U-shaped tube with the control assembly mounted therebetween.

17. The pool monitoring and control system as set forth in claim 11 wherein each sensor and dispenser is mounted on a U-shaped tube which has a bypass conduit with a valve for selectively bypassing the fluid from the pump directly to the pool.

18. The pool monitoring and control system as set forth in claim 11 wherein the control assembly further controls a temperature of water in the pool.

19. The pool monitoring and control system as set forth in claim 11 wherein the control assembly further controls a water level of the pool.

* * * * *